United States Patent
Takeda et al.

(10) Patent No.: US 10,675,944 B2
(45) Date of Patent: Jun. 9, 2020

(54) VEHICULAR AIR CONDITIONER

(71) Applicant: DENSO CORPORATION, Kariya, Aichi-pref. (JP)

(72) Inventors: Hiroshi Takeda, Kariya (JP); Akira Oga, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 38 days.

(21) Appl. No.: 16/068,921

(22) PCT Filed: Dec. 1, 2016

(86) PCT No.: PCT/JP2016/085786
§ 371 (c)(1),
(2) Date: Jul. 10, 2018

(87) PCT Pub. No.: WO2017/122453
PCT Pub. Date: Jul. 20, 2017

(65) Prior Publication Data
US 2019/0016192 A1    Jan. 17, 2019

(30) Foreign Application Priority Data
Jan. 15, 2016 (JP) .................. 2016-005968

(51) Int. Cl.
*B60H 1/00* (2006.01)
*G01V 8/12* (2006.01)

(52) U.S. Cl.
CPC ..... *B60H 1/00742* (2013.01); *B60H 1/00471* (2013.01); *B60H 1/00792* (2013.01); *G01V 8/12* (2013.01)

(58) Field of Classification Search
CPC ............ B60H 1/00742; B60H 1/00471; B60H 1/00792
See application file for complete search history.

(56) References Cited

U.S. PATENT DOCUMENTS 5,400,964 A * 3/1995 Freiberger ......... B60H 1/00742
236/91 C
6,012,297 A    1/2000 Ichishi et al.
(Continued)

FOREIGN PATENT DOCUMENTS

JP    S63255116 A    10/1988
JP    2000016074 A    1/2000
JP    4062124 B2    3/2008

OTHER PUBLICATIONS

JP 59-100012 (English Abstract) (Year: 1994).*

*Primary Examiner* — Jonathan Bradford
(74) *Attorney, Agent, or Firm* — Harness, Dickey & Pierce, P.L.C.

(57) ABSTRACT

A vehicular air conditioner includes a temperature detection unit that detects a surface temperature of an object based on radiation from the object, a swing mechanism unit that causes the temperature detection unit to swing, thereby changing a location of a detection region, the detection region being a region in which surface temperature is detected by the temperature detection unit, and a controller that controls an operation of the swing mechanism unit. The controller changes the operation of the swing mechanism unit based on a magnitude of a thermal load in a passenger compartment.

10 Claims, 8 Drawing Sheets

(56) References Cited

U.S. PATENT DOCUMENTS

2015/0105976 A1* 4/2015 Shikii .................. G06F 3/0488
  701/36
2015/0281533 A1* 10/2015 Sato .................... H04N 5/2259
  701/11

* cited by examiner

VEHICULAR AIR CONDITIONER

CROSS-REFERENCE TO RELATED APPLICATIONS

This application is a U.S. National Phase Application under 35 U.S.C. 371 of International Application No. PCT/JP2016/085786 filed on Dec. 1, 2016 and published in Japanese as WO 2017/122453 A1 on Jul. 20, 2017. This application is based on and claims the benefit of priority from Japanese Patent Application No. 2016-005968 filed on Jan. 15, 2016. The entire disclosures of all of the above applications are incorporated herein by reference.

TECHNICAL FIELD

The present disclosure relates to a vehicular air conditioner provided in a vehicle.

BACKGROUND ART

A vehicular air conditioner that measures a surface temperature of an occupant with an infrared sensor and performs air conditioning control based on the surface temperature is known. For example, Patent Literature 1 discloses a vehicular air conditioner in which an infrared sensor is disposed on a swing louver provided in a vent hole to calculate a surface temperature of an occupant.

In such a configuration, the direction of the infrared sensor periodically changes within a certain range in accordance with the swing of the swing louver. In other words, instead of measuring the surface temperatures of all the occupants in one measurement and at the same time, a local range is measured. As such, the entire temperature distribution is detected by gradually moving the local range while. Accordingly, it is possible to perform temperature measurement over a wide range including any occupants while using an inexpensive infrared sensor having a comparatively narrow detection range.

PRIOR ART LITERATURES

Patent Literature

Patent Literature 1: JP 4062124 B

SUMMARY OF THE INVENTION

The infrared sensor is disposed at a position where radiation (infrared rays) from each passenger including the driver can directly reach. For this reason, as described in Patent Literature 1, the infrared sensor is often disposed at a position in front of the driver and at a position relatively close to the driver. When the infrared sensor is disposed at such a position and swung, for the driver, the swinging of the infrared sensor and accompanying operation sounds may feel annoying.

The present disclosure has been made in view of such issues, and an object thereof is to provide a vehicular air conditioner in which a temperature detecting unit is swung while reducing the annoyance that a driver feels from this swinging.

A vehicular air conditioner according to the present disclosure includes a temperature detection unit (310) that detects a surface temperature of an object based on radiation from the object, a swing mechanism unit (320) that causes the temperature detection unit to swing, thereby changing a location of a detection region, the detection region being a region in which surface temperature is detected by the temperature detection unit, and a controller (100) that controls an operation of the swing mechanism unit. The controller changes the operation of the swing mechanism unit based on a magnitude of a thermal load in a passenger compartment.

When the heat load in the passenger compartment is large, the air temperature in the passenger compartment is either too high or too low. In this case, air conditioning is performed at maximum capacity, instead of, for example, performing precise air conditioning for concentrated cooling of only a high temperature area. In other words, when the thermal load is high, it is possible to say that there is a low necessity for the infrared sensor to acquire the entire temperature distribution in the passenger compartment. In this regard, if the temperature detection unit is not always subjected to swinging, but is rather limited to, for example, swinging only when the thermal load in the vehicle interior is low, it is possible to suppress annoyance to the driver as much as possible without impairing the comfort of air conditioning.

In the vehicular air conditioner having the above-described configuration, the operation of the swing mechanism unit, i.e., the swinging of the temperature detection unit is changed based on the magnitude of the thermal load in the passenger compartment. As a result, it is possible to properly perform the swinging of the temperature detection unit within a range that does not annoy the driver, without impairing the comfort of air conditioning.

According to a present disclosure, there is provided a vehicular air conditioner in which a temperature detecting unit is swung while reducing the annoyance that a driver feels from this swinging.

EMBODIMENTS FOR CARRYING OUT INVENTION

Figure 1:
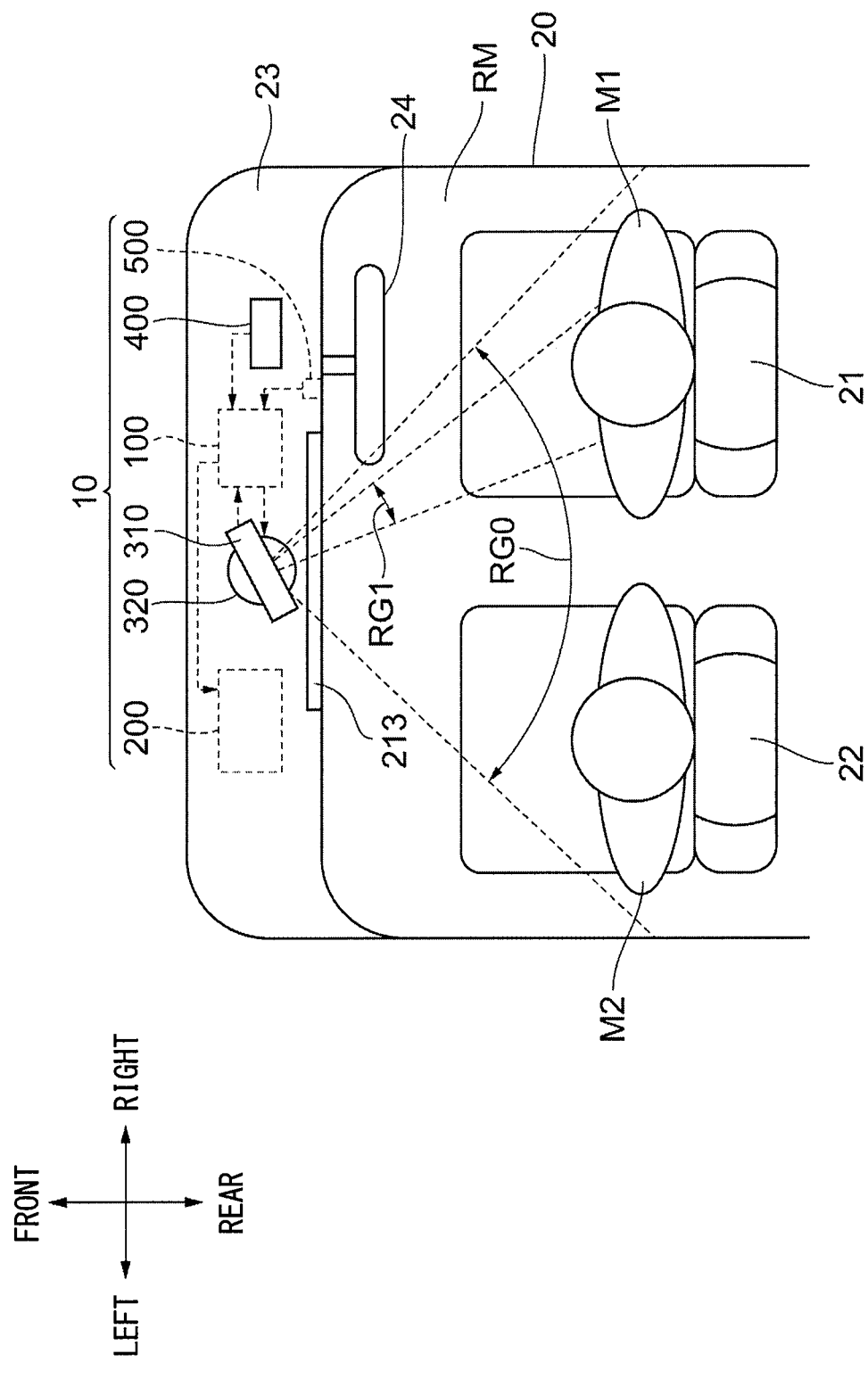
FIG. 1 is a diagram schematically showing a configuration of a vehicular air conditioner according to a first embodiment and a configuration of a vehicle to which the vehicular air conditioner is mounted.

Hereinafter, the present embodiments will be described with reference to the attached drawings. In order to facilitate the ease of understanding, the same reference numerals are attached to the same constituent elements in each drawing where possible, and redundant explanations are omitted.

A vehicular air conditioner 10 according to a first embodiment is mounted on a vehicle 20, and is configured as an apparatus for performing air conditioning in a passenger compartment RM. Prior to describing the vehicular air conditioner 10, the configuration of the vehicle 20 will be briefly described.

In FIG. 1, only the front side portion of the passenger compartment RM of the vehicle 20 is shown schematically in a top view. A driver seat 21 which is a seat on the right side and a passenger seat 22 which is a seat on the left side are provided on the front side portion of the passenger compartment RM so as to be adjacent to each other. In FIG. 1, a driver M1 seated in the driver seat 21 and a passenger M2 seated in the passenger seat 22 are shown. The reference numeral 24 indicates a steering wheel.

An instrument panel 23 is provided further on the front side of the driver seat 21 and the passenger seat 22. A blowout port 213 is formed in the central portion of the instrument panel 23 in the left-right direction. The blowout port 213 is an outlet for air whose temperature has been adjusted by the vehicular air conditioner 10, i.e., conditioned air. Conditioned air is blown out from the blowout port 213 toward the rear side, thereby performing air conditioning in the passenger compartment RM.

The configuration of the vehicular air conditioner 10 will be described with continued reference to FIG. 1. The vehicular air conditioner 10 includes a controller 100, an air conditioning mechanism unit 200, an IR sensor 310, a camera 400, and an inside air temperature sensor 500.

The controller 100 is a device for controlling the overall operation of the vehicular air conditioner 10. The controller 100 is configured as a computer system having a CPU, a ROM, a RAM, and the like. Signals from various sensors provided in the vehicle 20, such as the IR sensor 310 which will be described later, are input to the controller 100. The controller 100 controls the operations of the air conditioning mechanism unit 200, a sensor actuator 320, etc. based on signals input from various sensors. As a result, air conditioning in the passenger compartment RM by the vehicular air conditioner 10 may be appropriately performed.

The air conditioning mechanism unit 200 is a mechanism portion for performing air conditioning in the passenger compartment RM. The air conditioning mechanism unit 200 includes a refrigeration cycle (not shown), and adjusts the temperature of the conditioned air blown out from the blowout port 213 using this refrigeration cycle.

Figure 2:
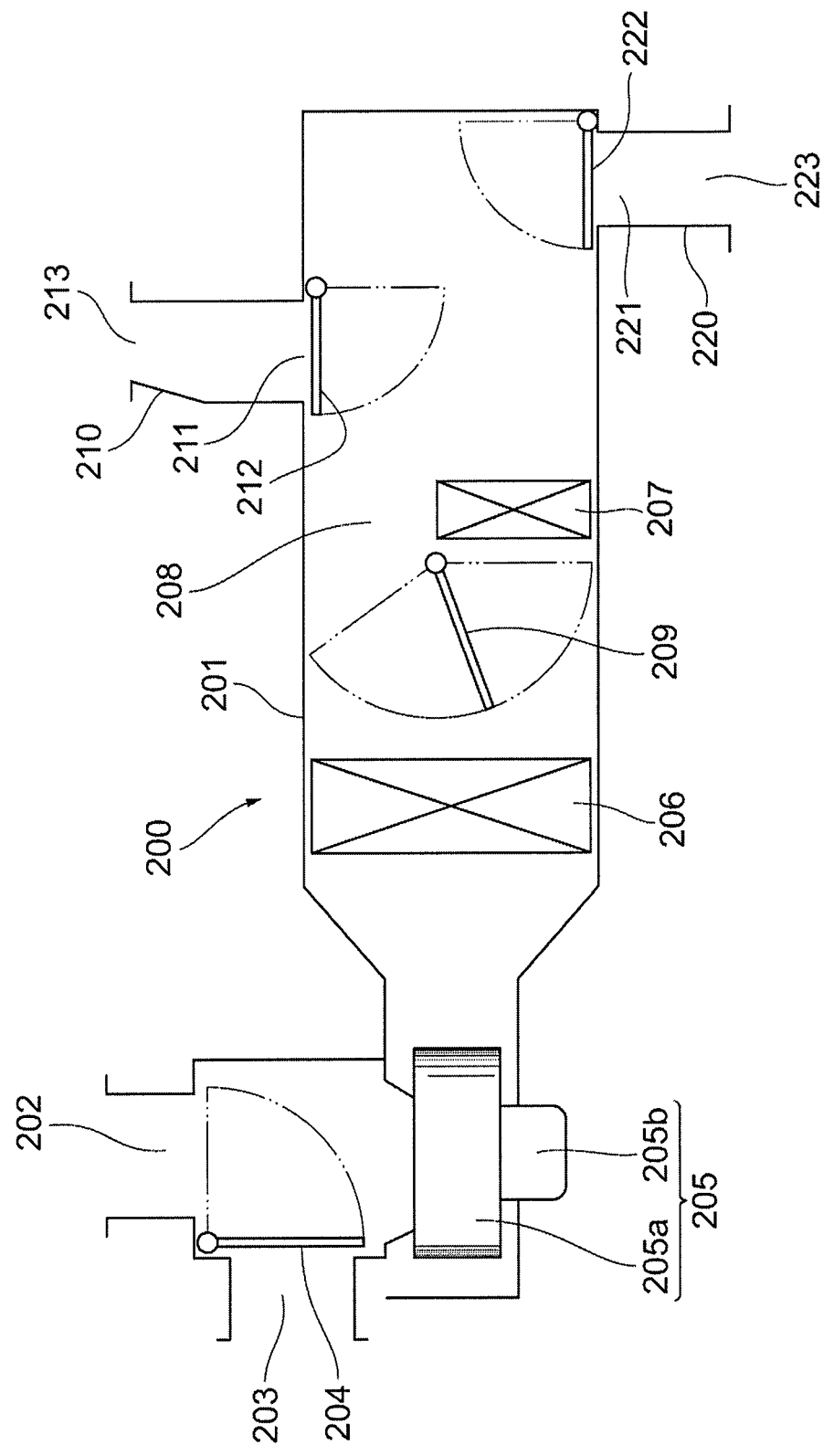
FIG. 2 is a diagram showing a configuration of an air conditioning mechanism unit.

The configuration of the air conditioning mechanism unit 200 will be described with reference to FIG. 2. The air conditioning mechanism unit 200 includes a case 201 which forms an outer shell. The case 201 forms an air passage for guiding air into the passenger compartment RM as an air conditioning target space. At the most upstream portion of the case 201 in the airflow direction, an inside air intake port 202 for drawing air (inside air) from the interior of the passenger compartment RM and an outside air intake port 203 for drawing air (outside air) from the outside of the passenger compartment RM are formed. In addition, the case 201 is provided with an intake port opening/closing door 204 for selectively opening and closing the respective intake ports (202, 203). The intake port opening/closing door 204 is operated to switch between an inside air circulation mode and an outside air circulation mode. The operation of the intake port opening/closing door 204 is controlled by a driving signal output from the controller 100.

A blower 205 is disposed on the airflow downstream side of the intake port opening/closing door 204. The blower 205 is an air blowing device for blowing air into the passenger compartment RM. The blower 205 has a centrifugal fan 205a and a fan motor 205b. The rotations peed of the fan motor 205b, i.e., the amount of air fed into the passenger compartment RM is controlled by a drive signal output from the controller 100.

An evaporator 206 is disposed on the air flow downstream side of the blower 205. The evaporator 206 is a heat exchanger for exchanging heat between refrigerant flowing therein and air sent by the blower 205. The evaporator 206 forms a vapor compression type refrigeration cycle together with a compressor, a condenser, an expansion valve, etc., which are not illustrated.

On the air flow downstream side of the evaporator 206, a heater core 207 for heating the air cooled by the evaporator 206 is disposed. The heater core 207 of the present embodiment is a heat exchanger that heats air using the coolant of an engine (not shown) of the vehicle 20 as a heat source. Further, on the air flow downstream side of the evaporator 206, a cold air bypass passage 208 is formed to allow air which passed through the evaporator 206 to bypass the heater core 207.

Here, the temperature of the conditioned air mixed on the air flow downstream side of the heater core 207 and the cold air bypass passage 208 varies depending on the air volume ratio of air passing through the heater core 207 and air passing through the cold air bypass passage 208.

Therefore, an air mix door 209 is disposed on the air flow downstream side of the evaporator 206 at a position which is the entrance side of the heater core 207 and the cold air bypass passage 208. The air mix door 209 continuously changes the air volume ratio of cold air flowing into the heater core 207 and the cold air bypass passage 208. Accordingly, the air mix door 209 functions as a temperature adjusting unit together with the evaporator 206 and the heater core 207. When the cold air bypass passage 208 is completely closed by the air mix door 209, the conditioned air blown into the passenger compartment RM is at a maximum temperature (MAXHOT). Further, When the cold air bypass passage 208 is fully opened by the air mix door 209 and the flow rate of air passing through the heater core 207 reaches zero, the conditioned air blown into the passenger compartment RM is at a minimum temperature (MAXCOOL). The degree of opening of the air mix door 209 is controlled by a control signal output from the controller 100.

A face opening 211 and a foot opening 221 are provided at the most downstream portion of the case 201 in the flow direction of the conditioned air. The face opening 211 is in communication with the blowout port 213 (see FIG. 1) formed in the instrument panel 23 via a face duct 210. The foot opening 221 communicates with a foot air outlet 223 through a foot duct 220. The foot air outlet 223 is an air outlet formed for blowing out conditioned air toward the feet of occupants.

Further, a face door 212 for opening and closing the face opening 211 and a foot door 222 for opening and closing the foot opening 221 are arranged on the air flow upstream side of each of the above openings (211, 221). The face door 212 and the foot door 222 are blowout mode doors which switch the blowing state of air into the passenger compartment RM. The opening/closing operation of the face door 212 and the foot door 222 is controlled by control signals output from the controller 100.

Returning to FIG. 1, explanation will be continued. The IR sensor 310 is installed on the upper surface of the instrument panel 23. In particular, the IR sensor 310 is arranged in the center of the instrument panel 23 along the left-right direction. The IR sensor 310 is a sensor that detects the surface temperature of an object in the passenger compartment RM based on the radiation from that object. "Object" as used here includes, for example, the body of an occupant, the glass of a window of the vehicle 20, a seat, etc. The IR sensor 310 is provided as a temperature sensor that detects the surface temperature of an occupant riding in the vehicle 20 so that air conditioning may be appropriately performed based on that surface temperature. The surface temperature detected by the IR sensor 310 is input to the controller 100.

The sensor actuator 320 is a driving device for changing the orientation of the IR sensor 310. The IR sensor 310 is attached to the upper surface of the instrument panel 23 via the sensor actuator 320. When the sensor actuator 320 operates and the orientation of the IR sensor 310 is changed, the location of an area where surface temperature is detected by the IR sensor 310 (hereinafter referred to as "detection region") changes. The operation of the sensor actuator 320 is controlled by a control signal output from the controller 100.

In FIG. 1, a range in which surface temperature can be detected by the IR sensor 310 in one detection is shown as a range RG1. In the present embodiment, a sensor with a relatively narrow angle is used as the IR sensor 310. Since the range RG1 in which surface temperature can be detected at once by the IR sensor 310 is narrow, it is impossible to simultaneously detect the surface temperatures of all occupants (such as the driver M1 and the passenger M2) at the same time in one detection.

Therefore, in the present embodiment, the direction of the IR sensor 310 is changed by the operation of the sensor actuator 320, and as a result the surface temperatures of each passenger is detected sequentially. More specifically, the sensor actuator 320 periodically swings the IR sensor 310 to the left and right, thereby detecting the surface temperature of each part in the passenger compartment RM.

In FIG. 1, the entire range in which surface temperature can be detected by the swinging of the IR sensor 310 is shown as a range RG0. When the IR sensor 310 swings, the orientation of the range RG1 changes within the range RG0. That is, the location of the detection region moves left and right within the range RG0. In the state shown in FIG. 1, a part of the surface of the driver M1 is the detection region. The range RG 0 is set as a range including the surfaces of all seated passengers.

Further, the IR sensor 310 may be installed in a place higher than the upper surface of the instrument panel 23, e.g., on an overhead console (not shown) on the ceiling. It is preferable that the installation site of the IR sensor 310 is a place reachable by radiation (infrared rays) from the surface of each passenger.

The camera 400 is a CCD camera that captures the face of the driver M1 and converts it into image data. The camera 400 is installed on the upper surface of the instrument panel 23, but it may be installed other locations as well. Generation of image data by the camera 400 is performed every time a predetermined period elapses. The image data generated by the camera 400 is input to the controller 100.

The inside air temperature sensor 500 is a temperature sensor for measuring the air temperature in the passenger compartment RM. The inside air temperature sensor 500 is disposed in a part of the instrument panel 23, but it may be disposed at other locations as well. The air temperature in the passenger compartment RM measured by the inside air temperature sensor 500 is input to the controller 100.

Based on the surface temperature of each passenger measured by the IR sensor 310 and the air temperature in the passenger compartment RM measured by the inside air temperature sensor 500, the controller 100 adjusts the temperature and air volume of conditioned air blown out from the blowout port 213. In addition, the controller 100 also adjusts the direction in which the conditioned air is blown out by controlling the operation of a louver (not shown) provided in the blowout port 213.

When the surface temperature of a passenger picked up en-route is high, for example during the summer, a control process is performed so as to direct low temperature conditioned air onto this passenger in a concentrated manner. In addition, when sunlight directly hits a portion of a passenger so as to be a localized high temperature portion, a control process is performed so as to direct low temperature conditioned air onto that portion in a concentrated manner. In this regard, by performing appropriate air conditioning based on the temperature distribution measured by the IR sensor 310, it is possible to ensure that the thermal sensation of each passenger feels comfortable.

The temperature distribution in the passenger compartment RM changes from moment to moment according to, for example, the strength and direction of incident sunlight, the temperature of the air conditioning wind, the blowing direction of the air conditioning wind, etc. Therefore, from the viewpoint of accurately acquiring the temperature distribution, the swing speed of the IR sensor 310 is preferably as fast as possible, and it is preferable that the swing period is as short as possible.

However, the IR sensor 310 is disposed relatively close to the driver M1. When the IR sensor 310 moves, that movement may be an unpleasant sight and therefore visually annoying the driver M1. In addition, as the swing speed of the IR sensor 310 increases, the operation sound of the sensor actuator 320 also increases, so that the driver M1 may be audibly annoyed as well.

Therefore, in the vehicular air conditioner 10 according to the present embodiment, instead of always swinging the IR sensor 310 at a constant period, by appropriately changing the swinging operation of the IR sensor 310, annoyance to the driver M1 may be reduced or prevented.

Figure 3:
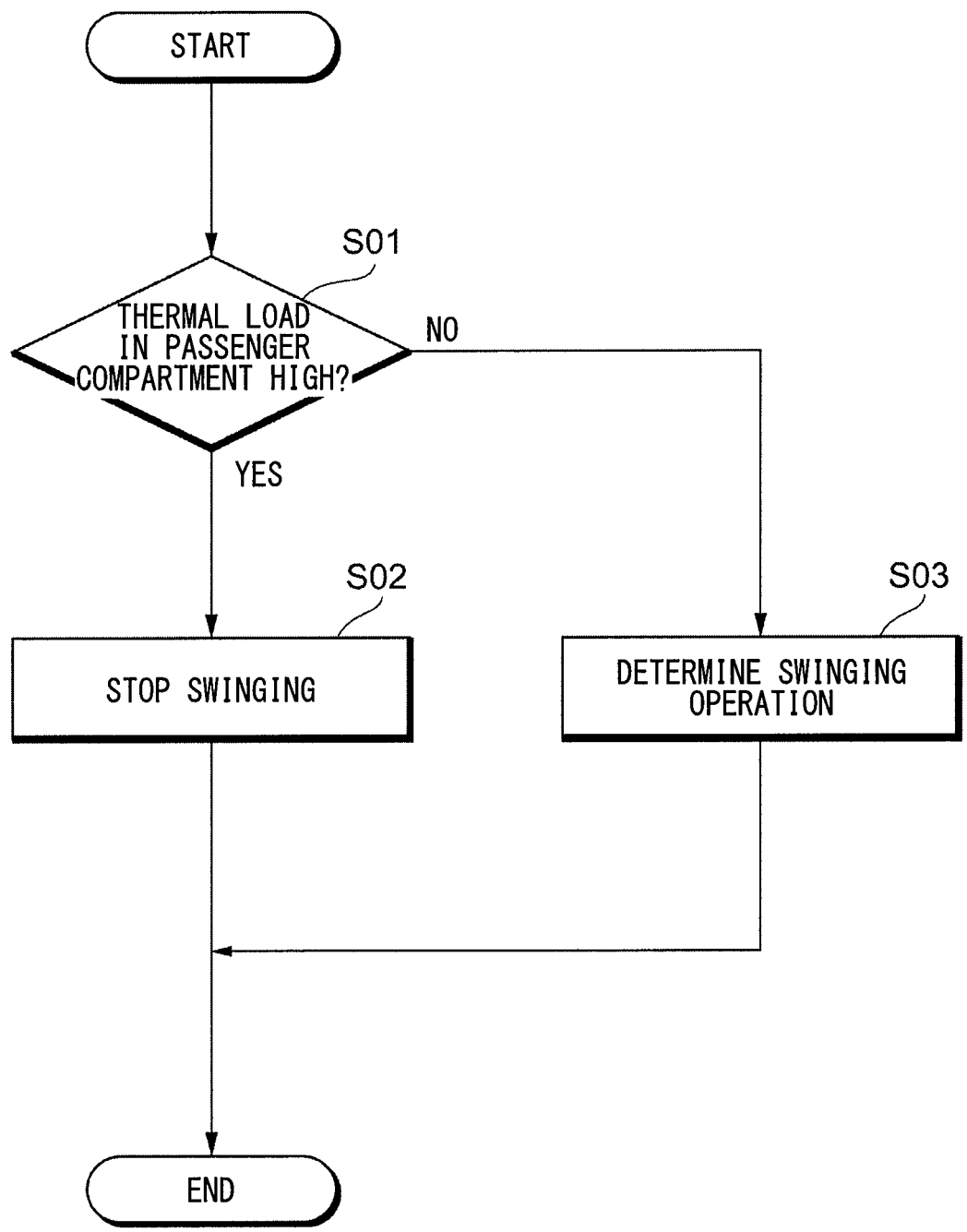
FIG. 3 is a flowchart showing a flow of a process executed by a controller.

The specific contents of the processing performed for that purpose will be described with reference to FIG. 3. The series of processing steps shown in FIG. 3 is repeatedly executed by the controller 100 each time a predetermined period elapses.

In the first step S01, it is determined whether or not the thermal load in the passenger compartment RM is high. Here, a "high thermal load" state as used herein refers to a state in which air conditioning is performed at the maximum capacity (or close thereto) of the vehicular air conditioner 10 due to the air temperature in the passenger compartment RM being extremely high or extremely low. For example, the thermal load may be determined to be high when a target blowout temperature is set to 50° C. or higher or when the target blowout temperature is set to 0° C. or lower.

As an alternative embodiment, the magnitude of the thermal load may be determined based on the degree of opening of the air mix door 209. In this case, the thermal load may be determined to be high when the cold air bypass passage 208 is completely closed by the air mix door 209 (MAXHOT) or when the flow rate of air passing through the heater core 207 is set to zero by the air mix door 209 (MAXCOOL).

If it is determined in step S01 that the thermal load is high, the process proceeds to step S02. In step S02, a control signal is transmitted from the controller 100 to the sensor actuator 320, and the swinging of the IR sensor 310 is stopped.

In this case, since air conditioning is performed at or near the maximum capacity of the vehicular air conditioner 10, precise air conditioning, such as concentrated cooling of only a high temperature portion, is not performed. Since air conditioning based on the distribution of the surface temperature is not performed, the swinging motion of the IR sensor 310 is unnecessary. Therefore, in step S02, unnecessary swinging motion is stopped, thereby protecting the driver M1 from being annoyed.

In step S01, if it is not determined that the thermal load is high, the process proceeds to step S03. In step S03, operation parameters of the swinging operation are determined. Here, operation parameters refer to the swing period of the IR sensor 310.

Figure 4:
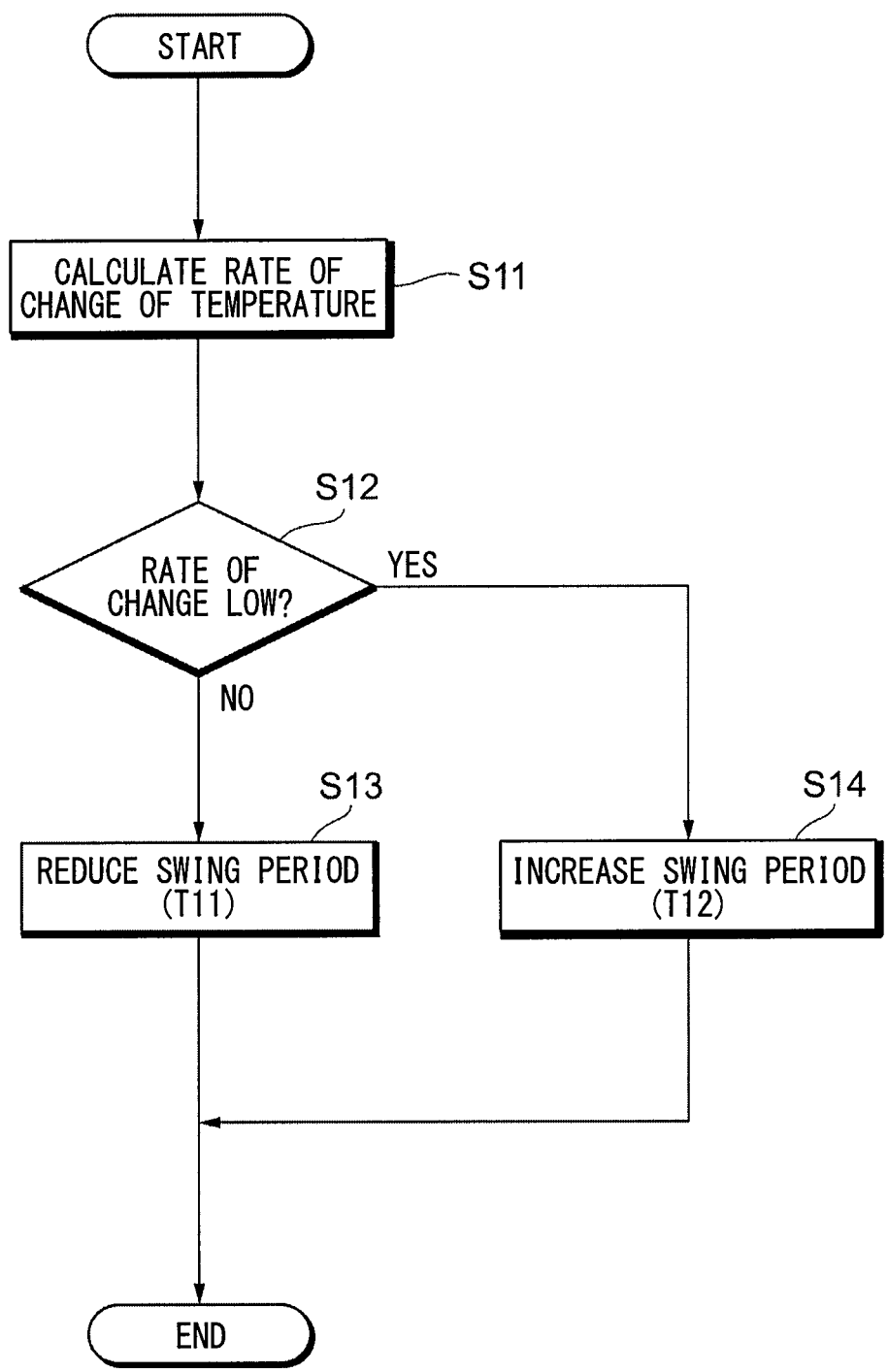
FIG. 4 is a flowchart showing a flow of a process executed by a controller.
Figure 5:
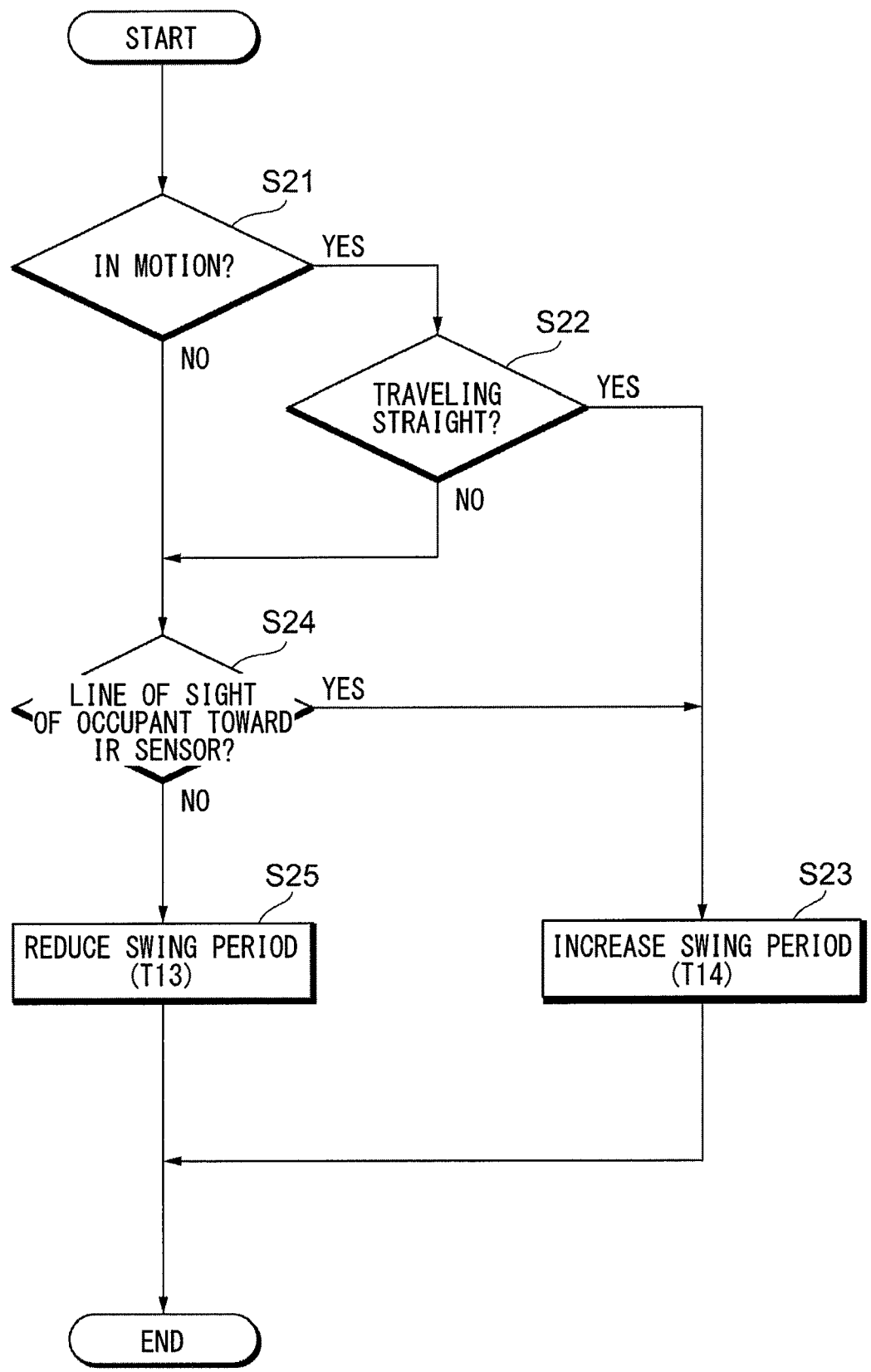
FIG. 5 is a flowchart showing a flow of a process executed by a controller.
Figure 6:
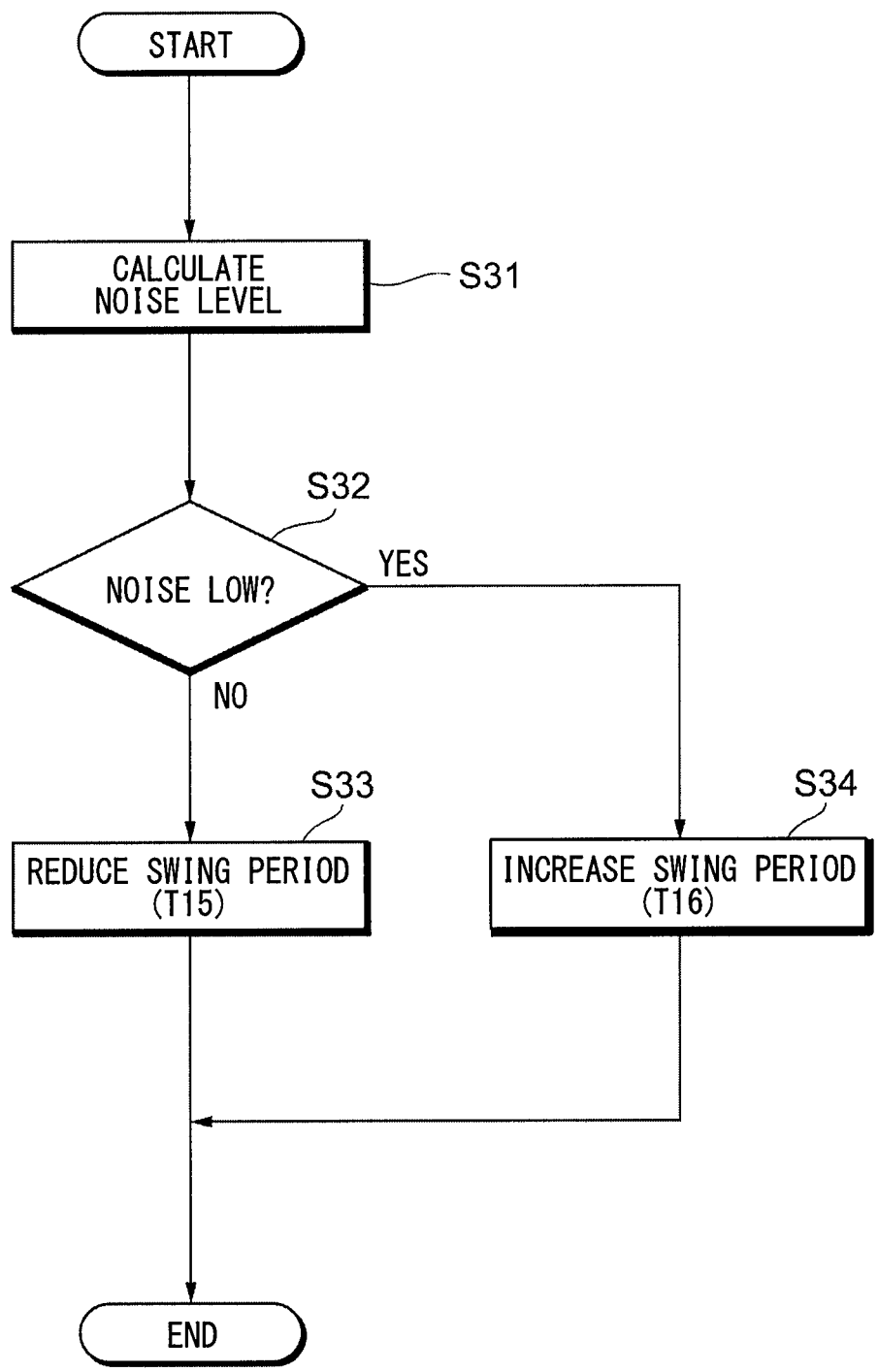
FIG. 6 is a flowchart showing a flow of a process executed by a controller.

In step S03, the processing steps shown in each of FIGS. 4, 5, and 6 are performed in parallel with each other. Then, an optimum swing period is determined.

First, the processing shown in FIG. 4 will be described. In the first step S11, the rate of change of the surface temperature of a specific occupant (for example, the driver M1) is calculated. The "rate of change" mentioned here is a change rate of the surface temperature of an occupant which is repeatedly acquired by the IR sensor 310 at each processing cycle. In particular, the rate of change is calculated as a value obtained by subtracting the previously detected surface temperature of an occupant from the currently obtained surface temperature of that occupant (i.e. a temperature change amount). Alternatively, the "rate of change" may be a value calculated as an amount of change in surface temperature per unit of time.

In step S12 following step S11, it is determined whether or not the calculated rate of change is low. Specifically, the rate of change is determined to be low when the change rate is lower than a predetermined threshold value. If it is determined that the rate of change is low, the process proceeds to step S14. At step S14, the swing period is set to a longer value T12. The value T12 is stored in the ROM of the controller 100 in advance, and is a value of the swing period to be set when the rate of change is low.

When the change rate is low, the temperature distribution in the passenger compartment RM is relatively stable. Therefore, even if the swing period of the IR sensor 310 is long, the temperature distribution in the passenger compartment RM can be grasped accurately to a certain extent. Therefore, at step S14, the swing period is set to the longer value T12 as described above. As a result, it is possible to suppress the swinging motion of the IR sensor 310 without negatively affecting the comfort of the air conditioning in the passenger compartment RM.

It should be noted that at the time of performing step S14, the actual swing period of the IR sensor 310 is not changed. In other words, the swinging operation of the IR sensor 310 is not changed at this point in time. The value T12 of the swing period set in step S14 is set as one candidate for the swing period.

If it is not determined in step S12 that the rate of change is low, the process proceeds to step S13. At step S13, the oscillation cycle is set to a shorter value T11. The value T11 is stored in the ROM of the controller 100 in advance, and is a value of the swing period to be set when the rate of change is not low (i.e., is high). The value T11 is smaller than the value T12 set in step S14.

When the rate of change is high, the temperature distribution in the passenger compartment RM is unstable, and there is a possibility that the temperature distribution in the passenger compartment RM will change greatly in a short period of time. Therefore, at step S13, the swing period is set to the shorter value T11 as described above. This makes it possible to accurately measure the temperature distribution in the passenger compartment RM to ensure that the air conditioning in the passenger compartment RM is comfortable.

It should be noted that at the time of performing step S13, the actual swing period of the IR sensor 310 is not changed. In other words, in the same manner as step S14, the swinging operation of the IR sensor 310 is not changed at this point in time. The value T11 of the swing period set in step S13 is set as one candidate for the swing period.

Next, the processing shown in FIG. 5 will be described. In the first step S21, it is determined whether or not the vehicle 20 is in motion. Here, the vehicle 20 is determined to be in motion when the traveling speed of the vehicle 20 is greater than 0 km/h. Further, it is determined that the vehicle 20 is not in motion (i.e., stopped) when the traveling speed of the vehicle 20 is 0 km/h. It should be noted that the vehicle 20 is also determined to be in motion when the vehicle 20 is traveling backwards, i.e., reversing. When it is determined that the vehicle 20 is in motion, the process proceeds to step S22.

At step S22, it is determined whether or not the vehicle 20 is traveling straight. When the vehicle 20 is traveling along a road, if the steering angle is relatively small, it is determined that the vehicle 20 is traveling straight. In contrast, when the vehicle 20 is making a right turn or a left turn and the steering angle is relatively large, it is determined that the vehicle 20 is not traveling straight. Specifically, the above determination may be performed based on whether or not the steering angle of the vehicle 20 is within a predetermined range.

When the vehicle 20 is traveling straight, the process proceeds to step S23. At step S23, the swing period is set to a longer value T14. The value T14 is stored in the ROM of the controller 100 in advance, and is a value of the swing period to be set when the vehicle 20 is traveling straight.

When the vehicle 20 is traveling straight, the driver M1 tends to be easily distracted from paying attention to the road. Therefore, if the IR sensor 310 swings greatly when traveling straight, the driver M1 may be distracted by the operation of the IR sensor 310 and feel annoyed by this operation. In addition, when the vehicle 20 is traveling straight, the direction and amount of sunlight entering the passenger compartment RM is relatively constant, and so the temperature distribution in the passenger compartment RM is relatively stable. For this reason, even if the swing period of the IR sensor 310 is long, the temperature distribution in the passenger compartment RM can be grasped accurately to a certain extent.

Therefore, at step 23, the swing period is set to the longer value T14 as described above. As a result, it is possible to suppress the swinging motion of the IR sensor 310 without negatively affecting the comfort of the air conditioning in the passenger compartment RM.

It should be noted that at the time of performing step S23, the actual swing period of the IR sensor 310 is not changed. In other words, the swinging operation of the IR sensor 310 is not changed at this point in time. The value T14 of the swing period set in step S23 is set as one candidate for the swing period.

When the vehicle 20 is not traveling in step S21, or when the vehicle 20 is not traveling straight ahead in step S22, the process proceeds to step S24. At step S24, it is determined whether the line of sight of the driver M1 is facing the IR sensor 310 or not. This determination is made by analyzing the image data generated by the camera 400. That is, the camera 400 functions as a line of sight detection unit that detects the direction in which the line of sight of the driver M1 is directed (hereinafter also referred to as "line of sight direction").

When the line of sight direction is a direction toward the IR sensor 310, the process proceeds to step S23. In this case, since the driver M1 is directly looking at the IR sensor 310, when the IR sensor 310 swings greatly, the driver M1 may feel annoyed by the operation of the IR sensor 310. Therefore, in step S23, as described previously, the swing period is set to the longer value T14.

At step S24, if the line of sight direction is not a direction toward the IR sensor 310, the process proceeds to step S25. At step S25, the oscillation cycle is set to a shorter value T13. The value T13 is stored in the ROM of the controller 100 in advance, and is a value of the swing period to be set when the line of sight direction is not a direction toward the IR sensor 310. The value T13 is smaller than the value T14 set in step S23.

When the line of sight direction is not directed to the IR sensor 310, since the driver M1 is not directly looking at the IR sensor 310, even if the swinging of the IR sensor 310 is performed, it is possible that the driver M1 is not particularly concerned with the IR sensor 310. Therefore, at step S25, the swing period is set to the shorter value T13 as described above. This makes it possible to accurately measure the temperature distribution in the passenger compartment RM to ensure that the air conditioning in the passenger compartment RM is comfortable.

It should be noted that at the time of performing step S25, the actual swing period of the IR sensor 310 is not changed. In other words, in the same manner as step S23, the swinging operation of the IR sensor 310 is not changed at this point in time. The value T13 of the swing period set in step S25 is set as one candidate for the swing period.

Next, the processing shown in FIG. 6 will be described. In the first step S31, the magnitude of noise in the passenger compartment RM is calculated. The magnitude of the noise is calculated based on the vehicle speed, the rotation speed of the internal combustion engine, the rotation speed of the fan motor 205*b*, the volume setting of in-vehicle audio, etc. by referring to a map which is prepared in advance and stored in the ROM. In an alternative embodiment, the noise in the passenger compartment RM may be directly measured by a microphone.

In step S32 following step S31, it is determined whether or not the magnitude of the calculated noise is low. Specifically, when the magnitude of the noise is lower than a predetermined threshold value, it is determined that noise is low. If it is determined that noise is low, the process proceeds to step S34. At step S34, the swing period is set to a longer value T16. The value T16 is stored in the ROM of the controller 100 in advance, and is a value of the swing period to be set when noise is low.

When the amount of noise is low, the operation sound of the swinging IR sensor 310 (and the sensor actuator 320) may sound harsh, and the driver M1 may be annoyed by this operation sound. Therefore, at step S34, the swing period is set to the longer value T16 as described above. This makes it possible to reduce the operation sound of the IR sensor 310.

It should be noted that at the time of performing step S34, the actual swing period of the IR sensor 310 is not changed. In other words, the swinging operation of the IR sensor 310 is not changed at this point in time. The value T16 of the swing period set in step S34 is set as one candidate for the swing period.

If it is not determined at step S32 that noise level is low, the process proceeds to step S33. At step S33, the oscillation cycle is set to a shorter value T15. The value T51 is stored in the ROM of the controller 100 in advance, and is a value of the swing period to be set when noise is not low (i.e., is high). The value T15 is smaller than the value T16 set in step S34.

When the noise level in the passenger compartment RM is high, the driver M1 may be more focused on this noise, so the driver M1 is unlikely to notice the operation sound of the swinging IR sensor 310 (and the sensor actuator 320). Therefore, at step S33, the swing period is set to the shorter value T15 as described above. This makes it possible to accurately measure the temperature distribution in the passenger compartment RM to ensure that the air conditioning in the passenger compartment RM is comfortable.

It should be noted that at the time of performing step S33, the actual swing period of the IR sensor 310 is not changed. In other words, in the same manner as step S34, the swinging operation of the IR sensor 310 is not changed at this point in time. The value T15 of the swing period set in step S33 is set as one candidate for the swing period.

Returning to FIG. 3, explanation will be continued. As described above, in step S03, the respective processes in FIG. 4 to FIG. 6 are performed in parallel, and three candidates for the swing period are set as a result of these processes. In step S03, the longest one of the set swing period candidates is determined as the final swing period value. Thereafter, the operation of the sensor actuator 320 is controlled so that the IR sensor 310 performs the swing operation with the determined swing period.

As described above, the controller 100 of the vehicular air conditioner 10 according to the present embodiment changes the operation of the sensor actuator 320 to change the swing operation of the IR sensor 310, based on the magnitude of the thermal load in the passenger compartment RM More specifically, when the thermal load in the passenger compartment RM is high, the operation of the sensor actuator 320 is stopped (step S02 in FIG. 3). In other words, when air conditioning in the passenger compartment RM is performed at or near the maximum capacity of the vehicular air conditioner 10, the unnecessary swinging operation of the IR sensor 310 is stopped. Therefore, it is possible to prevent the driver M1 from feeling annoyed without impairing the comfort of the air conditioning in the passenger compartment RM.

Further, the controller 100 changes the operation of the sensor actuator 320 based on the rate of change of the surface temperature of occupants. Specifically, when the rate of change of the surface temperature is low, the period of the swinging of the IR sensor 310 is lengthened as compared with the case where the rate of change is high (step S14 in FIG. 4). As a result, it is possible to suppress the swinging motion of the IR sensor 310 without negatively affecting the comfort of the air conditioning in the passenger compartment RM. As a result, it is possible to prevent the driver M1 from feeling annoyed.

Alternatively, the operation of the sensor actuator 320 may be changed as described above based on the rate of change of the temperature measured by the inside air temperature sensor 500 instead of the rate of change of the surface temperature of an occupant.

The controller 100 changes the operation of the sensor actuator 320 based on the traveling state of the vehicle 20. Specifically, when the vehicle 20 is in motion and traveling straight, the period of the swing of the IR sensor 310 is lengthened (step S23 in FIG. 5) as compared with the case where the vehicle 20 is not in motion and traveling straight.

As a result, it is possible to suppress the swinging motion of the IR sensor 310 without negatively affecting the comfort of the air conditioning in the passenger compartment RM. As a result, it is possible to prevent the driver M1 from feeling annoyed.

The controller 100 changes the operation of the sensor actuator 320 based on the line of sight direction detected by the camera 400. Specifically, when the line of sight direction is a direction toward the IR sensor 310, the period of the swing of the IR sensor 310 is lengthened (step S23 in FIG. 5) as compared with the case where it is not. This further prevents the driver M1 from feeling annoyed due to the swinging motion.

The controller 100 changes the operation of the sensor actuator 320 based on the magnitude of the noise in the passenger compartment RM. Specifically, when the noise in the passenger compartment RM is low, the period of the swing of the IR sensor 310 is lengthened (step S34 in FIG. 6) as compared with the case where the noise is high. This makes it possible to reduce the operation sound of the IR sensor 310. As a result, it is possible to prevent the driver M1 from feeling annoyed.

In steps S13 and S14 in FIG. 4, steps S23 and S25 in FIG. 5, and steps S33 and S34 in FIG. 6, candidate values for the swing period of the IR sensor 310 are set. In an alternative embodiment, candidate values for the swing amplitude of the IR sensor 310 may be set.

More specifically, in step S13 in FIG. 4, step S25 in FIG. 5, and step S33 in FIG. 6, rather than setting the swing period to a shorter value, the swing amplitude may be set to a larger value instead. Also, in step S14 of FIG. 4, step S23 of FIG. 5, and step S34 of FIG. 6, rather than setting the swing period to a longer value, the swing amplitude may be set to a smaller value instead.

In this case, in step S03 of FIG. 3, the smallest one among the three candidates (swing amplitude candidates) set in the respective processes of FIGS. 4 to 6 is determined as the final swing amplitude value. Then, the operation of the sensor actuator 320 is controlled so that the IR sensor 310 performs the swing operation with the determined swing amplitude.

Further, instead of the swing period and the swing amplitude of the IR sensor 310, candidate values for swing speed may be set. The swing speed in this case is the angular speed of the IR sensor 310 (and the sensor actuator 320) when performing the swinging motion.

More specifically, in step S13 in FIG. 4, step S25 in FIG. 5, and step S33 in FIG. 6, rather than setting the swing period to a shorter value, the swing speed may be set to a larger value instead. Also, in step S14 of FIG. 4, step S23 of FIG. 5, and step S34 of FIG. 6, rather than setting the swing period to a longer value, the swing speed may be set to a smaller value instead.

In this case, in step S03 of FIG. 3, the smallest one among the three candidates (swing speed candidates) set in the respective processes of FIGS. 4 to 6 is determined as the final swing speed value. Then, the operation of the sensor actuator 320 is controlled so that the IR sensor 310 performs the swing operation with the determined swing speed.

It should be noted that whether or not the driver M1 feels annoyed by the operation of the IR sensor 310 may vary depending on individual preferences. Therefore, instead of always setting the swing period etc. automatically with the controller 100, as an alternative embodiment, the driver M1 may change these at their discretion instead. For example, in an alternative configuration, the driver M1 may change the swing period etc. by operating a touch panel, or the driver M1 may change the swing period etc. using voice control.

A second embodiment will be described. The second embodiment is different from the first embodiment in the content of the process performed to set the candidate value of the swing period according to the rate of change of the surface temperature (that is, the process of FIG. 4 in the first embodiment). Other processes and configurations are the same as those in the first embodiment.

As described above, in the series of processes shown in FIG. 4, a value is selected from two predetermined values T11 and T12 in accordance with the obtained rate of change of the surface temperature, and this value set as the candidate value for the swing period. In contrast, in the present embodiment, the candidate value of the swing period is selected and set from values that are continuously variable.

Figure 7:
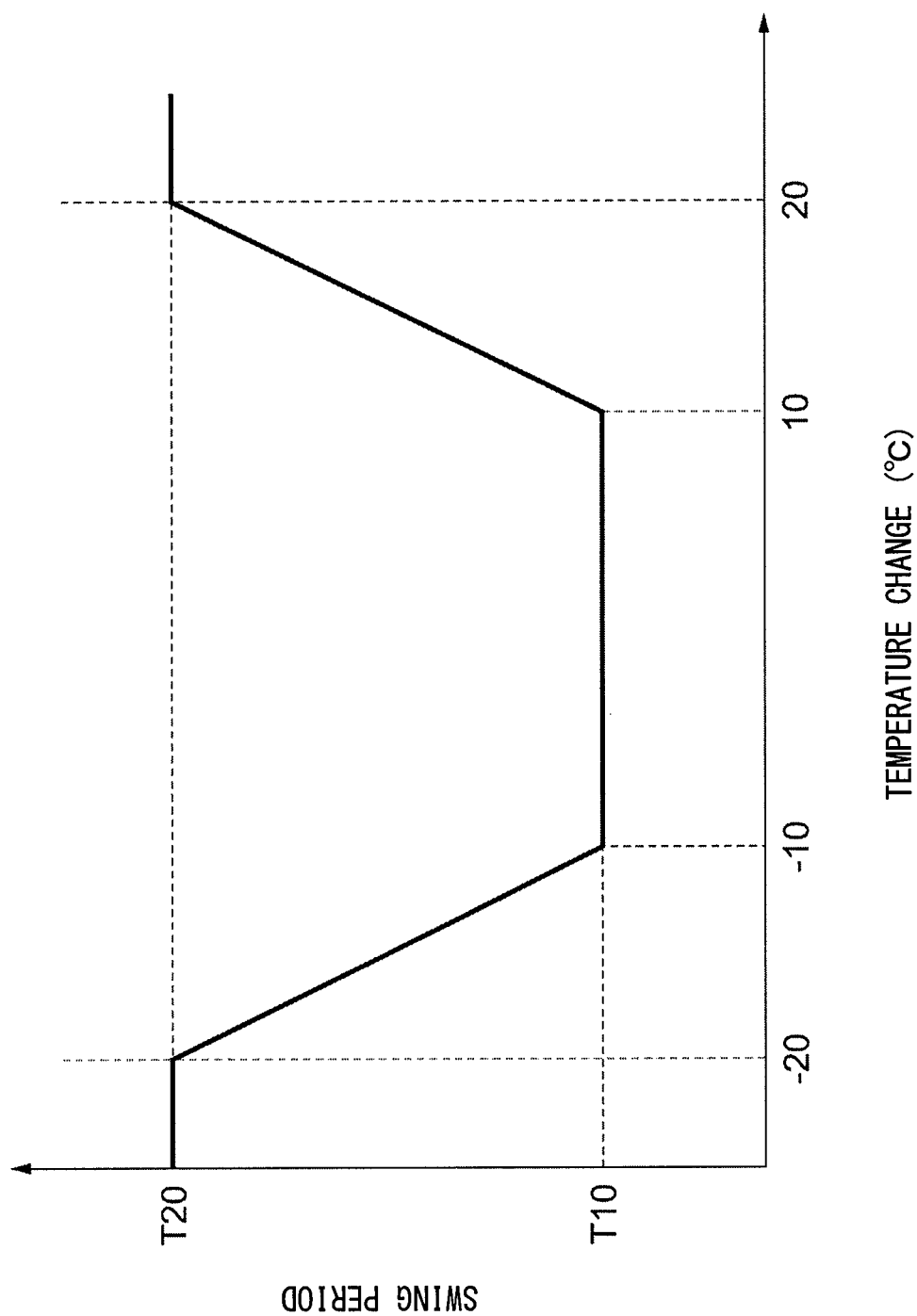
FIG. 7 is a diagram for explaining setting of a swing period in a second embodiment.

FIG. 7 shows the relationship between rate of change and swing period in the present embodiment. The horizontal axis in the graph of FIG. 7 is temperature change obtained by subtracting the previously acquired surface temperature of an occupant from the surface temperature of the occupant acquired this time. That is, it is the same as the "rate of change" calculated in step S22 of FIG. 4. The vertical axis in the graph of FIG. 7 is a value set as a candidate value of the swing period.

In the example shown in FIG. 7, when the temperature change (rate of change) is lower than −20° C., the candidate value of the swing period is set to a maximum value T20. When the temperature change is in the range of −20° C. to −10° C., as the absolute value of the temperature change decreases, the candidate value of the swing period is also reduced. When the temperature change is in the range of −10° C. to 10° C., the swing period is set to a minimum value T10 regardless of the temperature change. When the temperature change is in the range of 10° C. to 20° C., as the temperature change increases, the candidate value of the swing period is also increased. When the temperature change is greater than 20° C., the swing period is set to the maximum value T20 regardless of the temperature change.

As described above, according to the present embodiment, the candidate value of the swing period is appropriately set within a range from the value T10 to the value T20 based on the acquired value of the temperature change. By presetting the correspondence relationship as shown in FIG. 7, it is possible to more appropriately set the candidate value of the swing period.

Alternatively, instead of setting the candidate value of the swing period, a candidate value of swing speed may be set according to the acquired value of the temperature change, similar to the first embodiment. For example, the vertical axis in FIG. 7 may be set as swing speed and then the relationship between the rate of change and the swing speed may be set in advance as shown in FIG. 7.

A third embodiment will be described. In the third embodiment, the content of the process performed at step S24 in FIG. 5 is different from that of the first embodiment, and other processes and configurations are the same as in the first embodiment.

Figure 8:
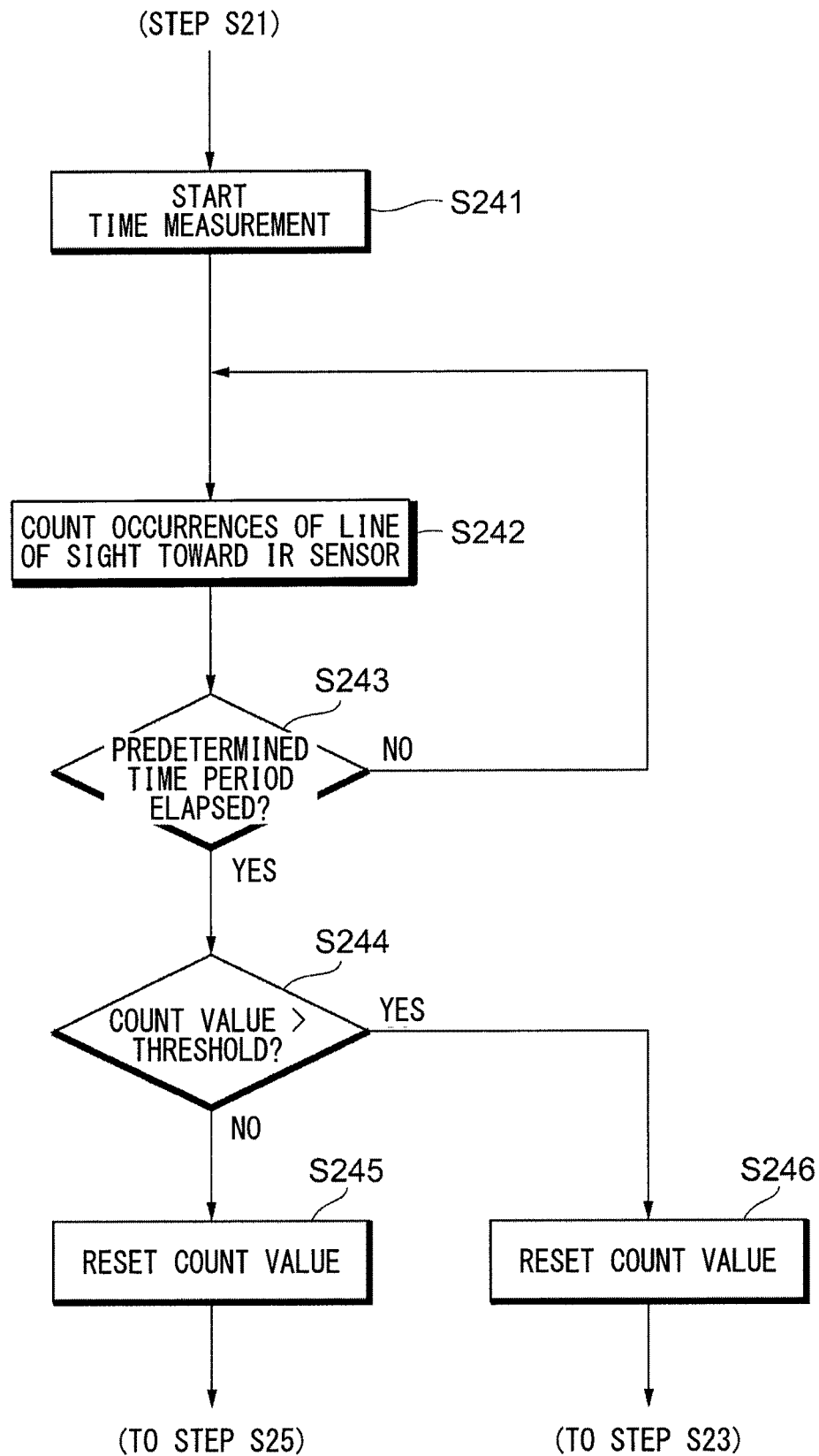
FIG. 8 is a flowchart showing a flow of a process executed by a controller in a third embodiment.

In the present embodiment, a series of processing steps shown in FIG. 8 is performed instead of step S24 in FIG. 5. If it is determined in step S21 of FIG. 5 that the vehicle 20 is not in motion, or if it is determined in step S22 of FIG. 5 that the vehicle 20 is not traveling straight ahead, the process at step S241 of FIG. 8 is performed. At step S241, a timer included in the controller 100 is reset, and a measurement of elapsed time is started.

In step S242 after step S241, the number of times that the line of sight of the driver M1 faces the IR sensor 310 after the process of step S241 is performed is counted. The determination as to whether or not the line of sight of the driver M1 faces the IR sensor 310, as well as the counting of that count, are performed by analyzing the image data generated by the camera 400.

At step S243 after step S242, by referring to the timer of the controller 100, it is determined whether or not a predetermined period of time has elapsed since the process of step S241 was performed. If the predetermined period has not elapsed, the process of step S242 is executed again. If the predetermined period has elapsed, the process proceeds to step S244.

At step S244, it is determined whether or not the number counted in step S242 exceeds a predetermined threshold value. In other words, it is determined whether, during an interval from the start of the processing of step S241 until the predetermined period elapses, the number of times that the line of sight of the driver M1 faces the IR sensor 310 (hereinafter also referred to as "count value") has exceeded a predetermined threshold value. If the count value exceeds the threshold value, the process proceeds to step S246. In step S246, the count value is reset. Thereafter, the process of step S23 in FIG. 5 is performed. That is, the candidate value of the swing period is set to the longer value T14.

If it is determined in step S244 that the count value has not exceeded the threshold value, the process proceeds to step S245. In step S245, the count value is reset. Thereafter, the process of step S25 in FIG. 5 is performed. That is, the candidate value of the swing period is set to the shorter value T13.

As described above, in the present embodiment, when the frequency (the count value per predetermined period) at which the line of sight direction becomes a direction toward the IR sensor 310 exceeds the predetermined threshold value, the controller 100 increases the swing period of the IR sensor 310. As a result, when the attention of the driver M1 is directed to the IR sensor 310, the swinging motion of the IR sensor 310 is suppressed, so that the attention of the driver M1 can be diverted from the IR sensor 310. As a result, it is possible to prevent the driver M1 from becoming distracted from the road while driving.

Alternatively, in steps S23 and S25 in FIG. 5, candidate values of the swing amplitude or the swing speed may be set instead of the candidate value of the swing period, as in the case of the first embodiment. That is, when the count value exceeds the threshold value, the candidate value of the swing amplitude of the IR sensor 310 may be set to a smaller value or the candidate value of the swing speed may be set to a smaller value.

The present embodiments have been described with reference to specific examples above. However, the present disclosure is not limited to these specific examples. Those skilled in the art appropriately design modifications to these specific examples, which are also included in the scope of the present disclosure as long as they have the features of the present disclosure. The elements, the arrangement, the conditions, the shape, etc. of the specific examples described above are not limited to those exemplified and can be appropriately modified. The combinations of elements included in each of the above described specific examples can be appropriately modified as long as no technical inconsistency occurs.

What is claimed is:

1. A vehicular air conditioner provided in a vehicle, comprising:
    a temperature detection unit that detects a surface temperature of an object based on radiation from the object;
    a swing mechanism unit that causes the temperature detection unit to swing, thereby changing a location of a detection region, the detection region being a region in which surface temperature is detected by the temperature detection unit; and
    a controller that controls an operation of the swing mechanism unit, wherein
    the controller changes the operation of the swing mechanism unit based on a magnitude of a thermal load in a passenger compartment,
    the controller stops the operation of the swing mechanism unit when the thermal load is high, and
    the controller changes the operation of the swing mechanism unit based on:
        a rate of change of: a surface temperature of an occupant or an air temperature in the passenger compartment;
        a traveling state of the vehicle; or
        a magnitude of noise in the passenger compartment.

2. The vehicular air conditioner according to claim 1, wherein,
    the controller is configured to, when the rate of change is low, increase a swing period of the swing mechanism unit, decrease a swing amplitude of the swing mechanism unit, or decrease a swing speed of the swing mechanism unit.

3. The vehicular air conditioner according to claim 1, wherein,
    the controller is configured to, when the vehicle is in motion, increase a swing period of the swing mechanism unit, decrease a swing amplitude of the swing mechanism unit, or decrease a swing speed of the swing mechanism unit.

4. The vehicular air conditioner according to claim 1, wherein,
    the controller is configured to, when the vehicle is traveling straight, increase a swing period of the swing mechanism unit, decrease a swing amplitude of the swing mechanism unit, or decrease a swing speed of the swing mechanism unit.

5. The vehicular air conditioner according to claim 1, further comprising:
    a line of sight detection unit that detects a line of sight direction which is a direction in which the line of sight of a driver faces, wherein
    the controller changes the operation of the swing mechanism unit based on the line of sight direction.

6. The vehicular air conditioner according to claim 5, wherein,
    the controller is configured to, when the line of sight direction is a direction toward the temperature detection unit, increase a swing period of the swing mechanism unit, decrease a swing amplitude of the swing mechanism unit, or decrease a swing speed of the swing mechanism unit.

7. The vehicular air conditioner according to claim 5, wherein,
    the controller is configured to, when a frequency at which the line of sight direction becomes a direction toward the temperature detection unit exceeds a predetermined threshold value, increase a swing period of the swing mechanism unit, decrease a swing amplitude of the swing mechanism unit, or decrease a swing speed of the swing mechanism unit.

8. The vehicular air conditioner according to claim 1, wherein,
the controller is configured to, when the noise in the passenger compartment is low, increase a swing period of the swing mechanism unit, decrease a swing amplitude of the swing mechanism unit, or decrease a swing speed of the swing mechanism unit.

9. A vehicular air conditioner provided in a vehicle, comprising:
an infrared sensor configured to detect a surface temperature of an occupant in a passenger compartment of the vehicle by measuring radiation from the occupant;
a sensor actuator coupled to the infrared sensor that, when operated, varies an orientation of the infrared sensor to change a location of a detection region, the detection region being a region in which surface temperature is detected by the infrared sensor; and
a controller coupled to the sensor actuator to control an operation of the sensor actuator with respect to the orientation of the infrared sensor, wherein
the controller is programmed to change the operation of the sensor actuator based on a magnitude of a thermal load in the passenger compartment,
the controller stops the operation of the sensor actuator when the thermal load is high, and
the controller changes the operation of the sensor actuator based on:
a rate of change of: a surface temperature of the occupant or an air temperature in the passenger compartment;
a traveling state of the vehicle; or
a magnitude of noise in the passenger compartment.

10. A vehicular air conditioner provided in a vehicle, comprising:
an infrared sensor configured to detect a surface temperature of an occupant in a passenger compartment of the vehicle by measuring radiation from the occupant;
a sensor actuator coupled to the infrared sensor that, when operated, varies an orientation of the infrared sensor to change a location of a detection region, the detection region being a region in which surface temperature is detected by the infrared sensor;
a controller coupled to the sensor actuator to control an operation of the sensor actuator with respect to the orientation of the infrared sensor; and
a line of sight detection unit that detects a line of sight direction which is a direction in which the line of sight of a driver faces, wherein
the controller is programmed to change the operation of the sensor actuator based on a magnitude of a thermal load in the passenger compartment,
the controller stops the operation of the sensor actuator when the thermal load is high, and
the controller changes the operation of the sensor actuator based on the line of sight direction.

* * * * *